US008208920B2

(12) United States Patent
Sampath et al.

(10) Patent No.: US 8,208,920 B2
(45) Date of Patent: Jun. 26, 2012

(54) REFERENCE SIGNAL MANAGEMENT IN MOBILE SYSTEMS

(75) Inventors: Hemanth Sampath, San Diego, CA (US); Jeremy H. Lin, San Diego, CA (US); Kurt W. Otte, Boulder, CO (US); Rajat Prakash, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 675 days.

(21) Appl. No.: 12/349,399

(22) Filed: Jan. 6, 2009

(65) Prior Publication Data

US 2009/0247156 A1      Oct. 1, 2009

Related U.S. Application Data

(60) Provisional application No. 61/040,617, filed on Mar. 28, 2008.

(51) Int. Cl.
*H04W 4/00* (2009.01)
*H04W 36/00* (2009.01)
*H04B 1/38* (2006.01)

(52) U.S. Cl. ................. 455/434; 455/574; 455/436

(58) Field of Classification Search ............ 455/67.11, 455/574, 436, 437, 41.2, 515
See application file for complete search history.

(56) References Cited

U.S. PATENT DOCUMENTS 4,972,346 A * 11/1990 Kawano et al. ............. 455/9
2008/0137562 A1* 6/2008 Li et al. ..................... 370/280

FOREIGN PATENT DOCUMENTS

WO      WO9731503       8/1997
WO      WO9905873       2/1999

OTHER PUBLICATIONS

Internation Al Search Report and Written Opinion—International Searching Authority, PCT/US2009/036707, May 5, 2009.
Holcman, A., et al. "CDMA intersystem operations", Vehicular Techonology Conference, 1994 IEEE 44th Stockhold, Sweden, Jun. 8-10, 1994; pp. 590-594, XP010123362.
Quoc-Thinh, et al. "Terminal-Controlled Mobility Management in Heterogenerous Wireless Networks", IEEE Communications Magazine, IEEE Service Center, Piscataway, US, vol. 4b, No. 4, Apr. 1, 2007, pp. 122-129, XP011176569.

* cited by examiner

*Primary Examiner* — George Eng
*Assistant Examiner* — Scott Au
(74) *Attorney, Agent, or Firm* — Larry Moskowitz; Abdollah Katbab (57)        ABSTRACT

A reference signal management (RSM) program executing on a mobile device detects multiple reference signals, allocates those reference signals into groups, and performs reference signal management functions using information conveyed in the reference signals. The RSM program detects both broadband and narrowband reference signals and maintains updated groups of reference signals that are transmitted from access points with independent configurations or different radio technologies. Battery power of the mobile device is efficiently used to manage reference signals in heterogeneous network environments by preventing unnecessary handoffs, overhead downloads, access probes and new registrations. Reference signals are managed from both synchronous and asynchronous sectors and in idle mode as well as in connected state mode. The RSM program performs functions such as managing handoffs between access points, managing an idle mode of the mobile device, managing an active group of the detected reference signals, and collecting overhead parameters for the mobile device.

60 Claims, 6 Drawing Sheets

REFERENCE SIGNAL MANAGEMENT IN MOBILE SYSTEMS

CROSS-REFERENCE TO RELATED APPLICATION

This application claims the benefit under 35 U.S.C. §119 of Provisional Application Ser. No. 61/040,617, filed on Mar. 28, 2008, said provisional application is incorporated herein by reference.

BACKGROUND INFORMATION

1. Technical Field

The present disclosure relates generally to wireless communication devices and, more specifically, to a method of monitoring and managing reference signals to extend standby time.

2. Background Information

Mobile subscribers consider long battery life to be a positive attribute of a mobile device, such as a cell phone. Battery life is typically described in terms of talk time and standby time. Even when a mobile subscriber is not carrying on a conversation, the cell phone still consumes power. Standby time is the length of time a battery can power a cell phone even when no calls are made. When a cell phone is turned on, the cell phone typically first acquires reference signals (also called pilot signals) before transmitting and receiving voice traffic over a traffic channel. For example, in some radio technologies, pilot signals are received over pilot, synchronization and paging channels. Once pilot signals are acquired, power is conserved by shutting down certain circuitry in the cell phone until a call is received or made. Other circuitry, however, must nevertheless be powered to detect whether the cell phone is receiving a call. Certain circuitry is turned on periodically to monitor the pilot signals transmitted over the pilot, synchronization and paging channels.

Even periodically monitoring pilot signals, however, consumes power. More power is consumed when the mobile device is operated in a heterogeneous network environment in which pilot signals are received from multiple wireless communication systems implementing multiple radio technologies. For example, a cell phone may be operated in a heterogeneous network environment in which access points operate using differing modulation techniques, such as code division multiple access (CDMA), time division multiple access (TDMA), frequency division multiple access (FDMA), orthogonal frequency division multiple access (OFDMA) and the modulation protocol defined by 3GPP LTE. CDMA modulation is employed by the radio technologies of cdma2000 and Universal Terrestrial Radio Access (UTRA). TDMA modulation is used by the Global System for Mobile Communications (GSM). OFDMA is used by radio technologies such as Evolved UTRA (E-UTRA), IEEE 802.11, IEEE 802.16, IEEE 802.20 and Flash-OFDM. Monitoring the multiple pilot signals received from access points that implement these various radio technologies consumes a significant amount of power.

Less power is consumed if pilot signals are acquired less frequently and if complex computations are performed less frequently on the pilot signals that are acquired. Standby time increases when fewer pilot signals are acquired and when fewer computations are performed on those acquired pilot signals. Thus, a method is sought for extending standby time by prioritizing and efficiently managing pilot signals received from heterogeneous access points.

SUMMARY

A reference signal management (RSM) program executing on an access terminal detects multiple reference signals, allocates the detected reference signals into groups of reference signals, and performs reference signal management functions using information conveyed in the detected reference signals. The RSM program detects both broadband acquisition reference signals and narrowband single-tone reference signals that are transmitted from access points that implement different radio technologies or that use the same system technology but having different configurations. Battery power of the access terminal is efficiently used to manage reference signals in a heterogeneous network environment by preventing unnecessary handoffs, overhead downloads, access probes and new registrations. Power is conserved because the access terminal does not indiscriminately acquire unuseful reference signals and does not perform complex calculations on overhead parameters to obtain results that are not used. Reference signals are managed from both synchronous and asynchronous sectors and in idle mode as well as in connected state mode. The RSM program maintains updated groups of reference signals, including a candidate group, a remaining group, an active group, a preferred reference signal list, a paging group, an access group and a serving sector group. The RSM program uses the updated groups of reference signals to perform functions such as managing handoffs between access points, managing the idle mode of the access terminal, managing the active group of detected reference signals, and collecting system configuration information for the access terminal. In a connected state mode of the access terminal the RSM program detects reference signal energies of both broadband TDM acquisition reference signals and narrowband single-tone reference signals.

In one specific embodiment, the RSM program performs reference signal management functions using overhead parameters conveyed in detected pilot signals. The RSM program detects both broadband acquisition pilot signals and narrowband beacon pilot signals that are transmitted using different radio technologies. Battery power of the access terminal is conserved by not indiscriminately acquiring unuseful pilot signals and by not performing complex calculations on overhead parameters to obtain results that are not used. The RSM program maintains updated sets of pilot signals, including a candidate set, a remaining set, an active set, a preferred pilot list, a paging set, a quick paging set, an access set and a serving sector set. The RSM program uses the updated sets of pilot signals to perform functions such as managing handoffs between access points, managing the idle mode of the access terminal, managing the active set of detected pilot signals, and collecting overhead parameters for the access terminal. In a connected state mode of the access terminal the RSM program detects pilot energies of both broadband TDM acquisition pilot signals and narrowband beacon pilot signals.

A method of managing reference signals involves detecting a plurality of reference signals, allocating the plurality of detected reference signals to a plurality of groups, and performing a reference signal management function using information conveyed in the plurality of reference signals. Some of the reference signal management functions performed include managing a handoff of an access terminal from the first access point to the second access point, managing an idle mode of the access terminal, managing an active group of reference signals for the access terminal, and collecting overhead parameters for the access terminal.

The detected reference signals include a first reference signal and a second reference signal. The first reference signal is transmitted from a first access point with a first configuration, and the second reference signal is transmitted from a second access point with a second configuration that is different from the first configuration. The first and second configurations can correspond to different system technologies, such as those used in wide area networks (WAN), a local area networks (LAN), and a personal area networks (PAN). The first and second configurations can also use the same system technology but different deployment parameters. For example, the deployment parameters of the two configurations may differ by a length of a cyclic prefix. The deployment parameters may differ by a number of Fast Fourier transform (FFT) tones used by the network. The different deployment parameters may be time and frequency synchronization parameters. For example, the time and frequency synchronization parameters of the first configuration may differ from the time and frequency synchronization parameters of the second configuration due to a lack of GPS synchronization.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

DETAILED DESCRIPTION

The techniques described herein are advantageously applied in heterogeneous network environments in which multiple wireless communication networks implement different radio technologies. For example, the multiple wireless communication networks may use various modulation techniques, such as Code Division Multiple Access (CDMA), Time Division Multiple Access (TDMA), Frequency Division Multiple Access (FDMA), Orthogonal FDMA (OFDMA), and Single-Carrier FDMA (SC-FDMA). A CDMA network may implement radio technologies such as Universal Terrestrial Radio Access (UTRA) and cdma2000. UTRA includes Wideband-CDMA (W-CDMA) and Low Chip Rate (LCR). cdma2000 covers the IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20 and Flash-OFDM. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2).

Single carrier frequency division multiple access (SC-FDMA) utilizes single carrier modulation and frequency domain equalization. SC-FDMA has similar performance and essentially the same overall complexity as those of OFDMA. An SC-FDMA signal has lower peak-to-average power ratio (PAPR) than does an OFDMA signal because of the inherent single carrier structure. SC-FDMA has drawn great attention, especially in the uplink communications where lower PAPR greatly benefits the mobile access terminal in terms of transmit power efficiency. SC-FDMA is currently a popular modulation technique for uplink multiple access schemes in 3GPP LTE and Evolved UTRA.

These radio technologies may support time division duplexing (TDD) or frequency division duplexing (FDD) or both. For example, FDD is employed in 3GPP LTE, Ultra-Mobile Broadband (UMB) also known as Evolution-Data Optimized Revision C, and FDD WiMax (IEEE 802.16). There are both FDD and TDD versions of W-CDMA. In a TDD system, the forward and reverse link transmissions use the same frequency band. FDD transceivers, on the other hand, independently generate the transmit and receive frequencies. These various radio technologies and standards are known in the art. For clarity, certain aspects of the techniques are described below for 3GPP LTE, and 3GPP LTE terminology is used in much of the description below. The aspects disclosed herein may also be applied to the other radio technologies listed above.

Figure 1:
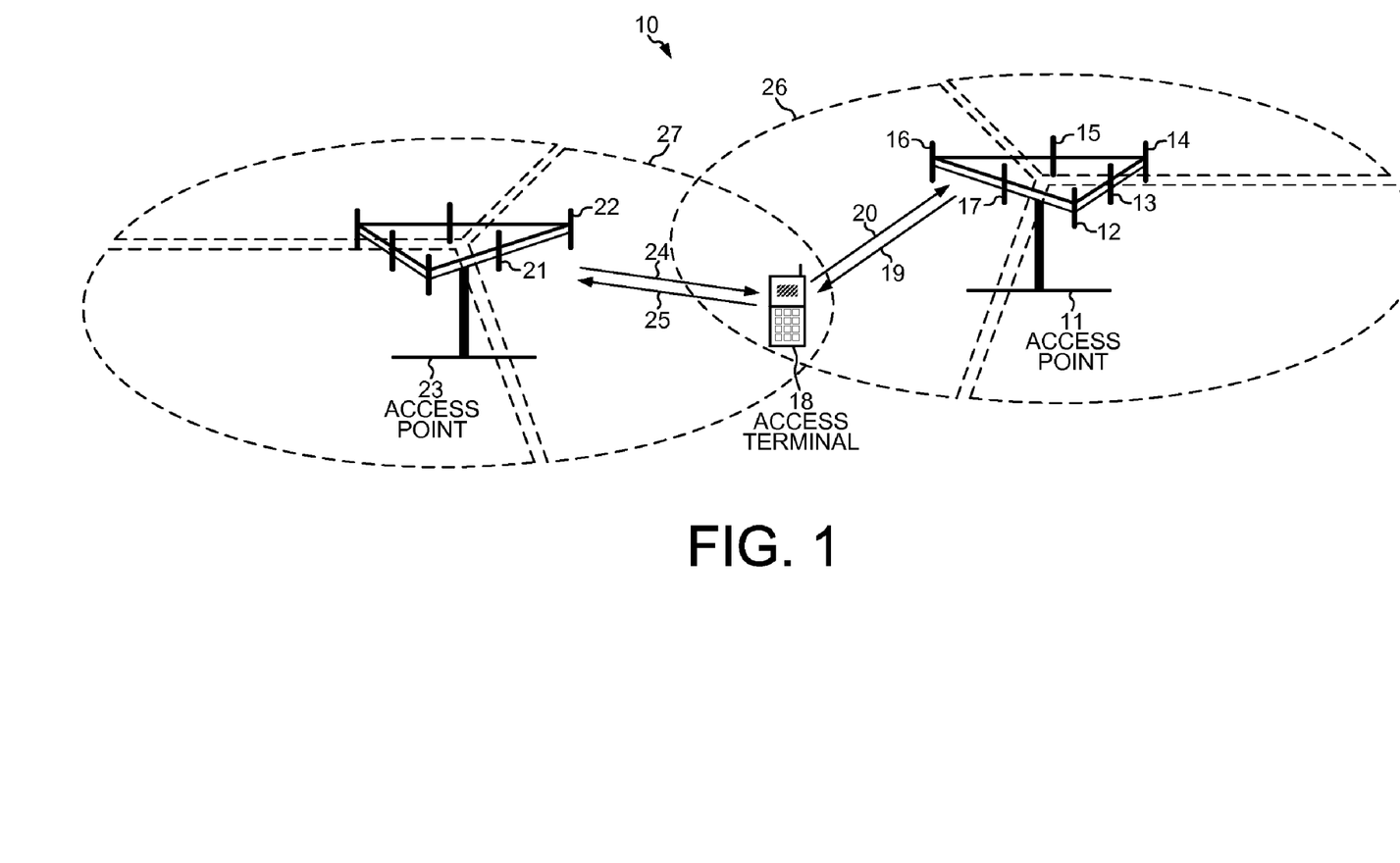
FIG. 1 is an illustration of an access terminal receiving reference signals according to one embodiment.

FIG. 1 illustrates a multiple-access wireless communication system 10 according to one embodiment. An access point 11 includes multiple antenna groups. One antenna group includes 12 and 13, another includes 14 and 15, and an additional group includes 16 and 17. Although in FIG. 1 only two antennas are shown for each antenna group, more or fewer antennas may be utilized for each antenna group. An access terminal 18 is in communication with antennas 16 and 17, where antennas 16 and 17 transmit information to access terminal 18 over a forward link 19 and receive information from access terminal 18 over reverse link 20. Access terminal 18 is also in communication with antennas 21 and 22 of another access point 23, where antennas 21 and 22 transmit information to access terminal 18 over forward link 24 and receive information from access terminal 18 over reverse link 25. In an FDD system, communication links 19, 20, 24, 25 may use different frequencies for communication. For example, forward link 19 may use a different frequency than that used by reverse link 20. Access points 11 and 23 may be fixed stations used for communicating with access terminals and are also referred to as base stations, Node Bs or some other terminology. Access terminal 18 may also be called user equipment (UE), a wireless communication device, a terminal, a cell phone, a mobile telephone or some other terminology.

Each group of antennas and the area in which they are designed to communicate is often referred to as a sector of the access point. In this embodiment, each antenna group is designed to communicate with access terminals in one sector of the areas covered by access points 11 and 23. FIG. 1 shows that access point 11 has three sectors, and access point 22 also has three sectors. Access terminal 18 is in communication with a sector 26 of access point 11 and with a sector 27 of access point 23. When the user of access terminal 18 is not sending or receiving voice or data traffic, access terminal 18 is in an idle mode. Alternatively, access terminal 18 is in a connected state mode when voice or data traffic is being sent to or received from the user of access terminal 18. When access terminal 18 is in the connected state mode and is in communication with antennas 16 and 17, sector 26 is said to be a serving sector. Sector 27 is a non-serving sector because although access terminal 18 is in communication with sector 27, the user of access terminal 18 is not sending or receiving voice or data traffic to or from sector 27. In communication over forward link 19, the transmitting antennas of access point 11 utilize beamforming in order to improve the signal-to-noise ratio of forward link 19.

Figure 2:
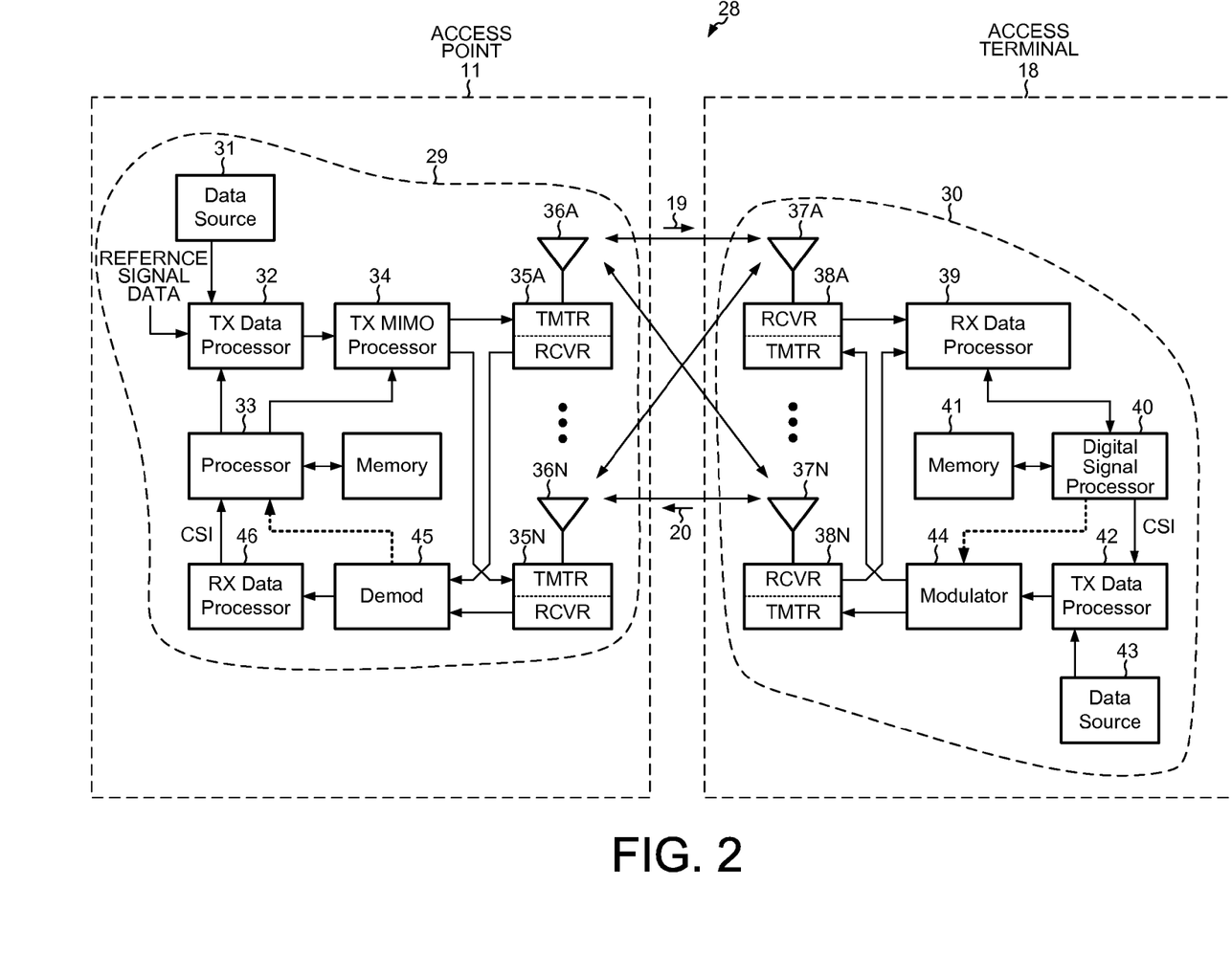
FIG. 2 is a block diagram of an embodiment of a wireless communication system in which an access terminal receives reference signal data from an access point.

FIG. 2 is a block diagram of an embodiment of a multiple-in-multiple-out (MIMO) wireless communication system 28 in which access terminal 18 is in communication with access point 11. Access point 11 includes a transmitter system 29, and access terminal 18 includes a receiver system 30.

At the transmitter system 29, traffic data for a number of data streams is provided from a data source 31 to a transmit (TX) data processor 32. In one embodiment, each data stream is transmitted over a different transmit antenna. TX data processor 32 formats, codes and interleaves the traffic data for each data stream based on a particular coding scheme selected for that data stream to provide coded data.

For example, the coded data for a data stream may be multiplexed with reference signal data using OFDM techniques. The reference signal data is typically a known data pattern that is processed in a known manner and is used by receiver system 30 to estimate the channel response. The multiplexed reference signal data and coded data for each data stream are then modulated (i.e., symbol mapped) based on a particular modulation scheme (e.g., BPSK, QSPK, M-PSK, or M-QAM) selected for that data stream to provide modulation symbols. The data rate, coding, and modulation for each data stream is determined by instructions performed by processor 33. The modulation symbols for all data streams are then provided to a TX MIMO processor 34 that further processes the modulation symbols (e.g., for OFDM). TX MIMO processor 34 then provides a number $N_T$ of modulation symbol streams to $N_T$ transmitters (TMTR) 35A through 35N. In certain embodiments, TX MIMO processor 34 applies beamforming weights to the symbols of the data streams and to the antenna that is transmitting the symbol.

Each transmitter 35 receives and processes a single symbol stream to provide one or more analog signals. In addition, each transmitter 35 further conditions (e.g., amplifies, filters, and upconverts) the analog signals to provide a modulated signal suitable for transmission over the MIMO channel. $N_T$ modulated signals from transmitters 35A through 35N are then transmitted from $N_T$ antennas 36A through 36N, respectively.

At receiver system 30, the transmitted modulated signals are received by a number $N_R$ of antennas 37A through 37N. The received signal from each antenna 37 is provided to a corresponding receiver (RCVR) 38A through 38N. Each receiver 38 conditions (e.g., filters, amplifies, and downconverts) the signal it receives, digitizes the conditioned signal to provide samples, and further processes the samples to provide a corresponding "received" symbol stream. An RX data processor 39 then receives and processes the $N_R$ received symbol streams from the $N_R$ receivers 38 based on a particular receiver processing technique to provide $N_T$ "detected" symbol streams. The RX data processor 39 then demodulates, deinterleaves, and decodes each detected symbol stream to recover the reference signal data or traffic data for the data stream. The processing by RX data processor 39 is complementary to that performed by TX MIMO processor 34 and TX data processor 32 of transmitter system 29.

The reference signal data and traffic data is then processed by a digital signal processor 40. In one embodiment, digital signal processor 40 executes a reference signal management program stored in a memory 41. The reference signal management program analyzes and manages the reference signal data and allocates detected reference signals into groups. A database of system configuration information (also called overhead parameters) from the reference signals, as well as the groups of reference signals, are stored in memory 41. In addition, digital signal processor 40 formulates a reverse link message comprising a matrix index portion and a rank value portion. The reverse link message may include various types of information regarding the communication link and the received data stream. The reverse link message is processed by a TX data processor 42, which also receives traffic data for a number of data streams from a data source 43. The reverse link message is then modulated by a modulator 44, conditioned by transmitters 38A through 38N, and transmitted back to transmitter system 29.

At transmitter system 29, the modulated signals from receiver system 30 are received by antennas 36, conditioned by receivers 35, demodulated by a demodulator 45, and processed by an RX data processor 46 to extract the reverse link message transmitted by the receiver system 30. Processor 33 then processes the extracted message and determines which pre-coding matrix to use for determining beamforming weights.

In modern communication systems, there has been an interest in providing interoperability between different communication platforms and systems, such as 3GPP LTE, UMB, WiMax, WiFi and IEEE 802.20. Access points in wireless communication systems that implement different radio technologies, however, may not be synchronous to each other. Even access points belonging to the same communication system may not, in certain instances, be synchronous with each other due to a lack of a common synchronization source. For example, the access points may lack GPS synchronization. In other instances, different access points can service cells and sectors with different sizes, leading to vastly different round-trip transmission times to access terminals. This causes asynchronicity. For example, some access points can be femto access points having cell diameters of a few tens of meters, whereas other access points can be macro access points with cell diameters of a few kilometers. These access points may be configured with different system configuration information, such as different cyclic prefix sizes. An access terminal, such as a mobile handheld device or laptop computer, may detect reference signals from one or more of such access points. The group of reference signals may be time-varying as each device moves from a system using one radio technology to a system using another radio technology or other overhead parameters or system configuration information. Hence, there is a need for the access terminal efficiently to manage such reference signals in order (i) to make intelligent decisions concerning which reference signals to handoff, (ii) whether to download new overhead information, (iii) and when to send access probes during connected state mode and idle mode. "Connected state mode" refers to a state of an access terminal when the device is actively communicating with an access point. "Idle mode" refers to a state when the access terminal has powered down one or more of its subsystems to save battery life and is no longer in active communication with an access point. An access terminal does, however, receive reference signals while in idle mode.

Consequently, there is a need for a reference signal management system in access terminals that operate in heterogeneous network environments in which different networks use different radio technologies or the same radio technology but using different overhead parameters, such as the cyclic prefix size or the number Fast Fourier transform (FFT) tones. A reference signal management system is needed that can efficiently manage and sort reference signals to prevent unnecessary handoffs, overhead downloads, access probes and new registrations. Such a reference signal management system should be able to handle synchronous and asynchronous systems in idle mode as well as in connected state mode. An alternative to an efficient reference signal management system would be to employ a brute force method of managing reference signals in which each access terminal acquires information from all reference signals in sectors of which it is in range, including both asynchronous and synchronous sectors. Such a brute force method of managing reference signals, however, would needlessly consume power because the access terminal would indiscriminately acquire unuseful reference signals and perform complex calculations on overhead parameters to obtain results that are not used.

Figure 3:
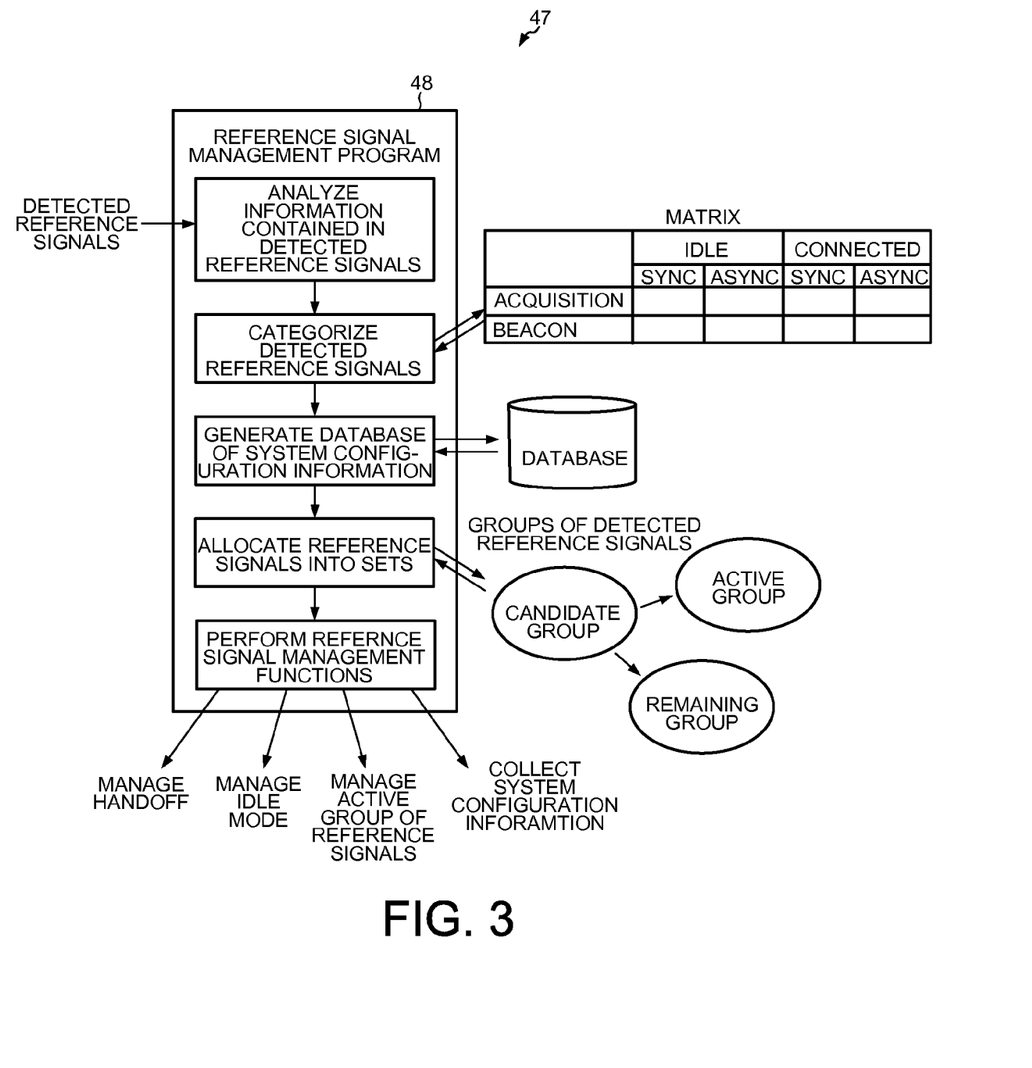
FIG. 3 is a diagram of a reference signal management program on the access terminal of FIG. 3 that performs connection and handoff functions by generating a matrix, database and groups using reference signals.

FIG. 3 is a diagram illustrating a general reference signal management concept 47 implemented on an access terminal. A reference signal management (RSM) program 48 stored on access terminal 18 provides management control and assistance for various types of connection, handoff and related issues of access terminal 18. The RSM program 48 manages specific details of network configurations, synchronous sectors, asynchronous sectors, and the idle and connected state modes of operation. By using a centralized management program, a single engine in access terminal 18 can be used to assist in the accumulation, dissemination, and control of configuration information used to operate a heterogeneous mobile network. For example, FIG. 3 illustrates the RSM program 48 configuring the connected modes of synchronous and asynchronous sectors using a matrix of broadband reference signals and narrowband, single-tone reference signals, respectively. The matrix is stored in memory 41. In some radio technologies, the broadband reference signals are referred to as acquisition pilot signals, and the narrowband reference signals are referred to as beacon pilot signals. In other radio technologies, the narrowband reference signals are referred to as power-boosted frequency carriers or power-boosted tones.

Acquisition pilot signals are time-division multiplexed broadband pilot signals transmitted by an access point on a periodic basis to assist the access terminal in obtaining synchronization information. Acquisition pilot signals are sometimes referred to as TDM pilot signals. Acquisition pilot signals are used by the access terminal to accurately synchronize time, frequency and transmission power to an access point. An acquisition pilot signal, however, suffers from the drawback that it places high complexity requirements on the access terminal for simultaneously decoding acquisition pilot signals from different asynchronous sectors. For example, in an OFDMA system, an access terminal may need to instantiate multiple FFT hardware engines in order to decode the acquisition pilot signals from asynchronous systems. Multiple FFT hardware engines may use multiple FFT tones. This is typically prohibitively expensive. For this reason, it is conventionally assumed that access terminals can use acquisition pilot signals only to detect synchronous access points.

Beacon pilot signals are power-boosted narrowband pilot signals transmitted by an access point on a periodic basis to assist the access terminal in obtaining synchronization information. Beacon pilot signals have the advantage that the access terminal can simultaneously detect beacon pilot signals from multiple asynchronous sectors with little increase in complexity. Unfortunately, beacon pilot signals do not provide very accurate time, frequency and power synchronization to an access point. As a result, an access terminal typically uses additional synchronization mechanisms after detecting a beacon pilot signal in order to more accurately synchronize time, frequency and power. For this reason, it is typically assumed that access terminals use beacon pilot signals to detect only synchronous access points.

Although other arrangements may be made according to design implementation, including multiple layers, the matrix of FIG. 3 illustrates a simple segregation of the mobile device operation for these sample modes. In one embodiment, the RSM program 48 is a software program that contains algorithms for dispatching tasks to manage mobile devices and their respective base stations. An intelligent scheduler is used to accumulate and dispense overhead information and manage handoffs so as efficiently to assist in minimizing power use and latency.

Figure 4:
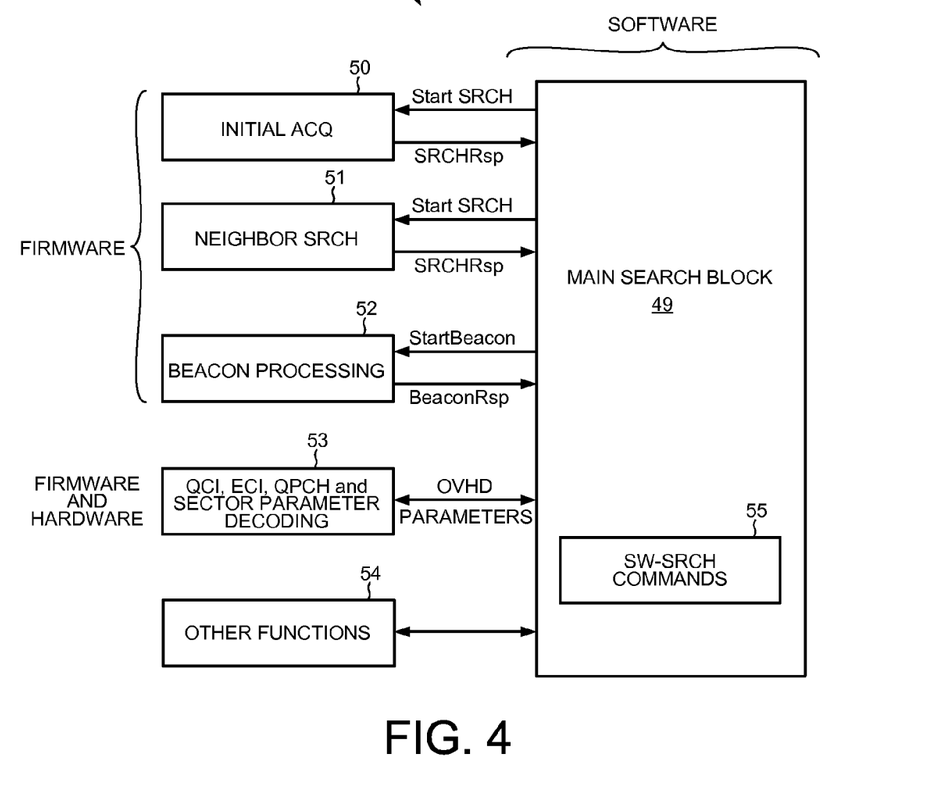
FIG. 4 is a block diagram illustrating software blocks of the reference signal management program of FIG. 3 that perform various reference signal management tasks.

FIG. 4 is a block diagram illustrating software blocks in one embodiment of RSM program 48. The software blocks are instructions stored in memory 41 and executed by digital signal processor 40. Exemplary tasks of reference signal management are controlled by a main search block 49. Main search block 49 initiates, controls and tabulates sub-blocks of code, such as an initial acquisition block 50, a neighbor search block 51, a beacon processing block 52, an overhead parameter processing block 53, and a block for performing other management functions 54. Initial acquisition block 50 is a firmware block that detects and analyzes acquisition pilot signals. Neighbor search block 51 is a firmware block that also detects and analyzes acquisition pilot signals. Beacon processing block 52 is a firmware block that detects and analyzes beacon pilot signals. Overhead parameter processing block 53 is a firmware block that processes overhead parameters using algorithms implemented in hardware. Overhead parameter processing block 53 decodes information from access points, such as Quick Channel Information (QCI), Extended Channel Information (ECI), information from Quick Paging Channels (QPCH) and sector parameter information.

Overhead parameter processing block 53 is used to acquire overhead parameters of a new sector. In one example, overhead parameter processing block 53 obtains overhead parameters by performing a sector parameter decode command on pilot signals in the preferred pilot list when certain conditions exist. The conditions include (i) that a sector parameter is unknown, (ii) that a supervision timer (also called a drop timer) equals zero, or (iii) that the relative energy (also call the geometry) of the new sector is greater than a predetermined sector parameter decode threshold. Overhead parameter processing block 53 also acquires overhead parameters of a new sector by issuing an ECI decode command on pilot signals in the preferred pilot list when certain conditions exist. The conditions include (i) that quick channel information and extended channel information are unknown, (ii) that the validity of known quick channel information and known extended channel information has expired, and QPCH decoding has failed once, (iii) that a supervision timer equals zero, or (iv) that a relative energy of the new sector is greater than a predetermined ECI decode threshold.

Overhead parameter processing block 53 also verifies overhead parameters (OVHD) of a new sector by performing QPCH decoding on pilot signals under certain conditions, such as (i) the validity of a known OVHD parameter of a regular access terminal having expired, (ii) the validity of a known OVHD parameter of a push-to-talk access terminal expiring shortly, or (iii) a pilot signal received by the push-to-talk access terminal being in the access group.

Other reference signal management tasks are also implemented by block 54 according to design preference. Main search block 49 also allocates the various pilot signals into groups both during connected state mode and idle mode of access terminal 18.

Main search block 49 also manages the tasks that determine the pilot energy of pilot signals and calculate the geometry of sectors or access points. The geometry of both synchronous and asynchronous sectors and access points are calculated. The pilot energy of a pilot signal is measured in dBm. The geometry of a sector or access point is the ratio of the pilot energy of a pilot signal from that sector or access point to the pilot energies of other pilot signals from other sectors or access points. The geometry of a sector or access point A can be derived as: geometry (A)=(pilot energy (A))/(pilot energy (A)+pilot energy (B)+pilot energy (C)+ . . . pilot energy (N)), where A, B, C . . . N are the sectors or access points for which pilot energy information is available at the access terminal.

Main search block 49 makes handoff decisions for the forward link as well as performs associated overhead management in a very efficient manner, resulting in less battery use and faster response times for the access terminal.

In one of several possible embodiments, software search (SW SRCH) commands 55 executed by main search block 49 generates a database of overhead parameters from pilot signals detected from each access point or sector. Main search block 49 builds the database using the functions performed by the firmware of blocks 50-52, such as the search response (SearchResponse or SRCHRsp) and beacon response (BeaconResponse or BeaconRsp) functions. The database of overhead parameters is stored in memory 41. Some of the overhead parameters of the database include: PilotEnergyTDM, AvgPilotEnergyTDM, PilotEnergyBeacon, AvgPilotEnergyBeacon, CPLength, SyncToServingSectorBit, Geometry, DropTimer and TimingOffset.

The PilotEnergyTDM parameter is obtained from acquisition pilot signals and is calculated by algorithms in the SRCHRsp function. The AvgPilotEnergyTDM parameter also relates to acquisition pilot signals and is obtained by IIR filtering of the PilotEnergyTDM parameter, for example, using 100 msec averaging. The PilotEnergyBeacon is obtained from beacon pilot signals and calculated using algorithms in the BeaconRsp function. The AvgPilotEnergyBeacon parameter also relates to beacon pilot signals and is obtained by IIR filtering of the PilotEnergyBeacon parameter, for example, using 200 msec averaging. The CPLength parameter indicates the cyclic prefix length of the delay spread that access terminals in the associated sector can tolerate. The SyncToServingSectorBit parameter indicates whether the serving sector is synchronous or asynchronous. In one embodiment, setting the bit to 1 or 0 indicates that the serving sector is synchronous or asynchronous, respectively.

The geometry parameter indicates the ratio of pilot energy of one pilot signal to the energies of all detected pilot signals. The DropTimer parameter is invoked when a PilotEnergy parameter exceeds a certain threshold or duration. Thus, the DropTimer parameter is used to track the period in which the pilot energy is below the threshold or duration. The TimingOffset parameter indicates the offset relative to the serving sector. Other overhead parameters in the database include the number of antennas in the serving sector, which FFT tones are used for Fourier transform calculations, the number of frames or time slots in a superframe and the number of OFDM symbols in a frame.

In the connected state mode, a pilot signal is considered to be synchronous to the serving sector if its pilot energy is detected by the SRCHRsp function associated with the serving sector. In one implementation, the geometry of a given sector A is calculated as Geometry (A)=(pilot energy (A))/(pilot energy (A)+pilot energy (B)+pilot energy (C)+ . . . pilot energy (N)), where the pilot energy refers to the AvgPilotEnergyTDM parameter for those sectors with the SyncToServingSectorBit parameter being synchronous, and the pilot energy being the AvgPilotEnergyBeacon parameter for those sectors with the SyncToServingSectorBit parameter being asynchronous.

In order to maintain current overhead parameters during handoff, the SyncToServingSectorBit parameter should be updated for each sector. Using geometry calculations it is possible to assess the energy level arising from different sectors that are within range or nearly within range of the access terminal.

In the connected state mode, the software search (SW SRCH) commands 55 executed by main search block 49 further classify the detected pilot signals into multiple groups, such as CandidateSet, RemainingSet and ActiveSet (ASET). Each newly detected pilot signal is first added to the CandidateSet if the pilot signal meets minimum energy criteria for a certain duration of time. Pilot signals in the CandidateSet are either promoted to the ActiveSet or demoted to the RemainingSet based upon additional criteria. Most of the overhead collection and handoff operations are restricted to the pilot signals in the ActiveSet, as opposed to being performed on all detected pilot signals. Performing operations only on the ActiveSet limits the computations that must be performed by the access terminal and hence prolongs battery life. Sample criteria for classifying newly detected pilot signals into one of the three groups CandidateSet, RemainingSet and ActiveSet is described below.

A pilot signal is added to the CandidateSet based on its geometry parameter exceeding a certain threshold, called the AddThreshold. A pilot signal is deleted from the ActiveSet if its DropTimer parameter falls below a PilotDropTimer parameter. A pilot signal is removed from the CandidateSet if its DropTimer parameter is greater than or equal to the PilotDropTimer parameter. Where a pilot signal is deleted from the Candidate Set, the pilot signal is moved to the RemainingSet without changing the DropTimer parameter for the pilot signal. If adding a newly detected pilot signal to the CandidateSet would result in the maximum size of the CandidateSet being exceeded, software search (SW SRCH) commands 55 delete the weakest pilot signal in the CandidateSet.

A pilot signal is added to the RemainingSet if the pilot signal is deleted from the CandidateSet or the ActiveSet. A given pilot signal is deleted from the RemainingSet in two situations. First, the pilot signal is deleted if the DropTimer parameter of the given pilot signal is greater than or equal to the PilotDropTimerRemainingSet parameter. Second, the pilot signal is deleted if (i) another pilot signal is added to the RemainingSet, (ii) the size of the RemainingSet exceeds its threshold (MaxRemainingSetSize), and (iii) the given pilot signal is the weakest signal.

The ActiveSet is configured when the access terminal constructs a PilotReport message. The access point is periodically updated with this PilotReport message. The serving access point uses the PilotReport message to add each new sector and access point to the ActiveSet. The access point "tunnels" the overhead parameters of the newly added sector to the access terminal. "Tunneling" is a process wherein the serving access point A communicates with another access point B using a wired or wireless link to obtain all of the overhead parameters of access point B and then transmits those overhead parameters to the access terminal using the serving sector communication link.

Figure 5:
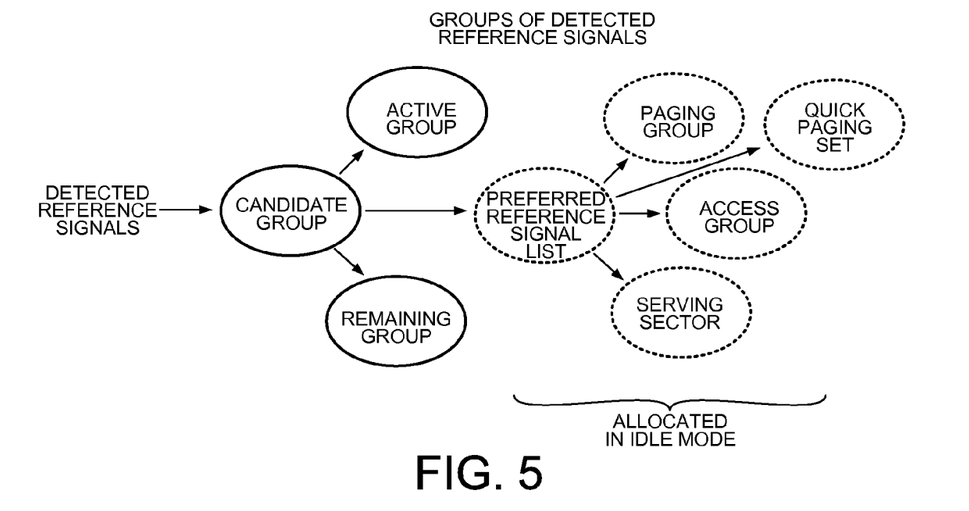
FIG. 5 is a diagram illustrating how the reference signal management program of FIG. 3 allocates detected reference signals into groups and subgroups.

FIG. 5 is a diagram illustrating how RSM program 48 allocates detected pilot signals into groups and subgroups. In the idle mode (sleep state), the software search commands 55 within main search block 49 further classify newly detected pilot signals into multiple groups, such as PreferredPilotList, PagingSet, AccessSet, and ServingSector. Each newly detected pilot signal is first added to the CandidateSet provided the newly detected pilot signal meets the minimum energy criteria for a predetermined duration of time. Only pilot signals in the CandidateSet are then promoted to one of the PreferredPilotList, PagingSet, AccessSet or ServingSector based upon additional criteria described below. This is done so that time and power intensive operations are restricted to a smaller subgroup of pilot signals, rather than being performed on the entire collection of pilot signals. For example, access terminal 18 sends an access probe only to access points associated with pilot signals in the AccessSet because transmitting an access probe is very power intensive for an access terminal in idle mode. In another example, access terminal 18 monitors only pages in pilot signals belonging to the PagingSet. This improves the probability that a page will be successfully detected and consequently reduces power consumption and prolongs battery life. Power is also saved by receiving and transmitting data packets only from and to access points associated with pilot signals in the ServingSector.

Detected pilot signals are allocated to the PreferredPilotList (PPL) as follows. A newly detected pilot signal is added to the PreferredPilotList if its geometry parameter exceeds the AddThreshold. If the geometry parameter of the pilot signal falls below the DropThreshold, then a timer that generates the DropTimer parameter is invoked. The pilot signal is then dropped from the PreferredPilotList if the DropTimer parameter becomes greater than or equal to the maximum {SleepPeriod*NumSleepCycles, DropTimerMin} in msec. In addition, the pilot signal is dropped from the PreferredPilotList if the size of the PreferredPilotList exceeds a threshold.

Pilot signals from the PreferredPilotList are added to the PagingSet if the sector parameter information in the pilot signal has been decoded, and main search block 49 determines that the access point corresponding to the pilot signal is sending pages to the access terminal. A pilot signal in PagingSet is deleted if the pilot signal has been deleted from the PreferredPilotList. The pilot signals in the PagingSet are sorted based on registration status and also by geometry.

Pilot signals in the PreferredPilotList are added to the AccessSet if all overhead parameters from the access point corresponding to the given pilot signal have been successfully decoded and validated. The pilot signals in the AccessSet are sorted based on geometry. A pilot signal in the AccessSet is deleted if the pilot signal has been deleted from the PreferredPilotList.

The strongest pilot signal in the PreferredPilotList for which all overhead parameters have been decoded is the ServingSector. To save battery life, the ServingSector pilot signal is confined to access points for which the access terminal already has registration information, unless the geometry of a newly detected pilot signal in another registration zone is significantly better than the pilot signals in the current registration zone. For example, for a new pilot signal in a different registration zone to replace the existing ServingSector pilot signal, the geometry of the new pilot signal must exceed the sum of the geometry of the ServingSector plus the IdleHandoffHysterisysMargin. The idle hand-off hysteresis margin is added to prevent unnecessary registration operations that are very time and power intensive.

The subgroups of pilot signals described above are only a list of some convenient categories used by a preferred reference signal management program. In some instances, it is desirable to reduce the number of subgroups or to increase the number of subgroups. Therefore, other groups or subgroups of pilot signals may be used according to design preference.

The RSM program 48 performs idle-mode call flow in several scenarios. One scenario is based on when an access terminal wakes up during paging cycles. The access terminal monitors QuickPages and/or pages every paging cycle from the access point corresponding to the PagingSet. The access terminal typically decodes QuickPages first due to lower terminal computation complexity. Some radio technologies use a quick paging channel (QPCH) in addition to a paging channel to extend standby time. The paging channel and the quick paging channel are distinct code channels. QuickPage pilot signals are transmitted on the QPCH. The quick paging channel includes quick paging bits that are set to indicate a page in the general paging message of the paging channel. If both quick paging bits in the quick paging channel are not set, the access terminal need not demodulate the subsequent general paging message in the general paging channel. Less energy is consumed demodulating the quick paging bits than demodulating the relatively longer general paging message. By demodulating the quick paging bits of the quick paging channel, the general paging message in the paging channel can be demodulated only when there is a page. The access terminal must correctly decode the QPCH to determine whether the access terminal has been paged.

After a QuickPage is successfully decoded, but where there is no valid page to the access terminal, the access terminal sleeps until the next paging cycle. Otherwise, the access terminal decodes a full page on the first pilot signal of the PagingSet if all QPCH decoding fails or upon the successful decoding of a QPCH with a valid page. In a deployment with asynchronous sectors or access points, on every paging cycle the access terminal also decodes beacon pilot signals that correspond to other asynchronous access points or sectors. If firmware of beacon processing block 52 reports a valid full page, the access terminal sends access probes to the strongest sector indicated by the pilot signals in the AccessSet. In idle mode, the access terminal monitors and decodes overhead channels for pilot signals in the PreferredPilotList based upon predetermined rules, such as (i) if the overhead information is unknown, (ii) the DropTimer equals zero, or (iii) the geometry of a pilot signal is greater than the OverheadDecodeThreshold.

For example, when access terminal 18 wakes up during a paging cycle to decode a QuickPage, RSM program 48 initiates an acquisition pilot signal search (Start SRCH function)

for a pilot signal that has already been allocated to the preferred pilot list. RSM program 48 decodes the pilot signal from the preferred pilot list. Then if the QuickPage is successfully decoded, RSM program 48 waits for the next superframe to perform an additional pilot signal search function. If the QuickPage is not successfully decoded, access terminal 18 goes back to sleep.

Push-To-Talk (PTT) access terminals initiate calls in a very short time period. Hence, PTT access terminals do not expend time to collect overhead parameters from scratch when the access terminal initiates a call. As a result, even in idle mode, PTT access terminals monitor and decode overhead parameters with higher frequency in order to prevent having outdated overhead information. In one embodiment, the access terminal monitors and decodes the QPCH channel in order to ensure that overhead parameters are up-to-date. A failure to decode the QPCH channel may indicate that the overhead parameters are outdated. Thus, when QPCH channel decoding fails, the PTT access terminal decodes overhead channels and updates its overhead information.

Figure 6:
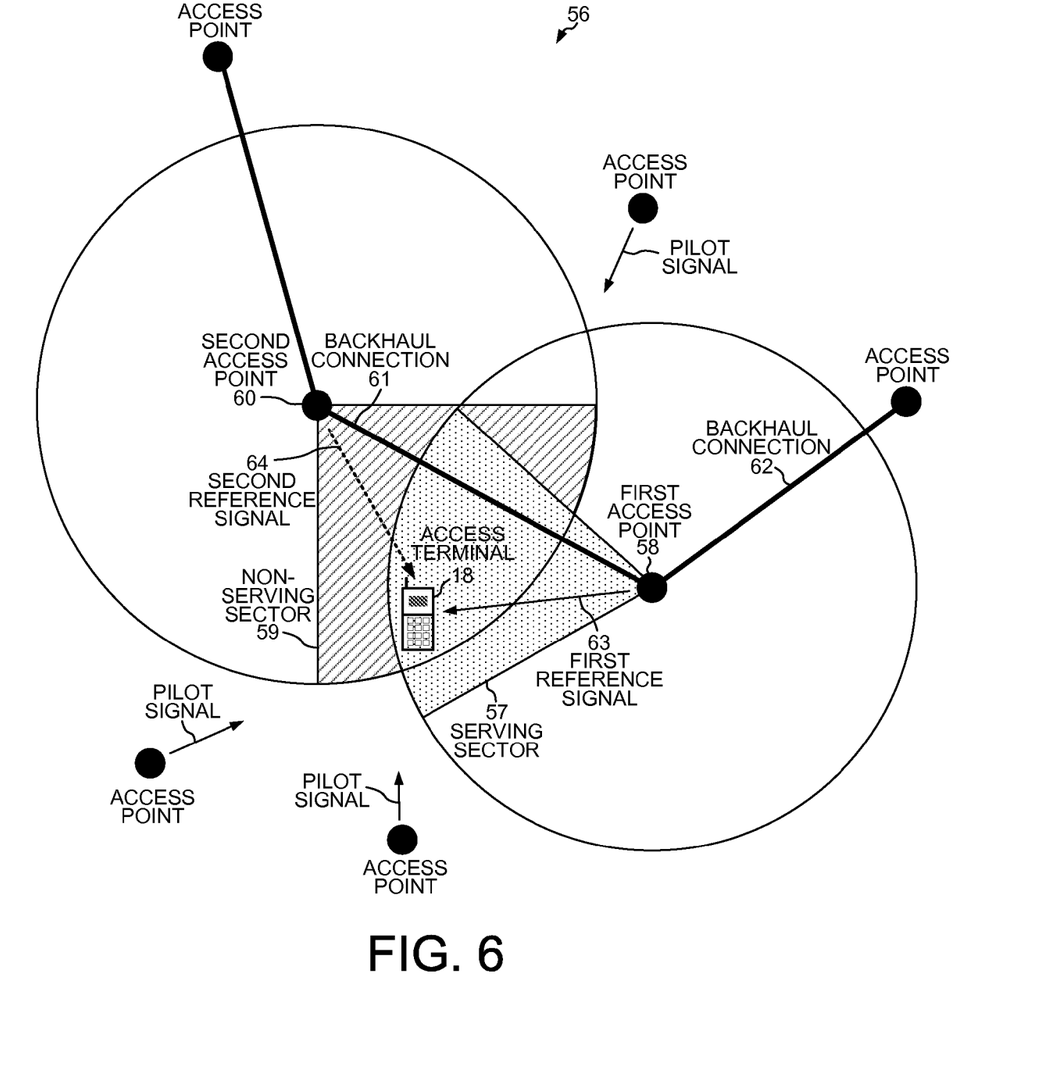
FIG. 6 illustrates an exemplary heterogeneous network topology in which the reference signal management program of FIG. 3 manages reference signals and performs connection and handoff functions.

FIG. 6 illustrates an exemplary heterogeneous network topology 56 in which RSM program 48 operates. Access terminal 18 borders on two sectors. A first sector 57 is covered by a first access point 58. A second sector 59 is covered by a second access point 60. First sector 57 is a serving sector because access terminal 18 is actively communicating with sector 57. Second sector 59 is a non-serving sector because the user of access terminal 18 is not actively sending or receiving voice or data traffic to or from second sector 59. RSM program 48 is resident on access terminal 18. First access point 58 is connected to second access point 60 by a backhaul connection 61. First access point 58 is also connected to another access point by a backhaul connection 62.

In one example, first access point 58 implements the 3GPP LTE radio technology. Thus, serving sector 57 is a synchronous sector. Second access point 60 implements the IEEE 802.11 radio technology, and non-serving sector 59 is an asynchronous sector. RSM program 48 efficiently manages the handoff between heterogeneous networks. First access point 58 transmits a first pilot signal 63, and second access point 60 transmits a second pilot signal 64. In this heterogeneous network topology, there are also other networks that implement different radio technologies. Thus, access points from networks implementing multiple radio technologies are transmitting pilot signals that reach access terminal 18. In addition, access terminal 18 is receiving pilot signals from access points implementing the same radio technology as first access point 58, but those other access points may be heterogeneous because they employ other operating parameters, such as cyclic prefix sizes and FFT tones.

Figure 7:
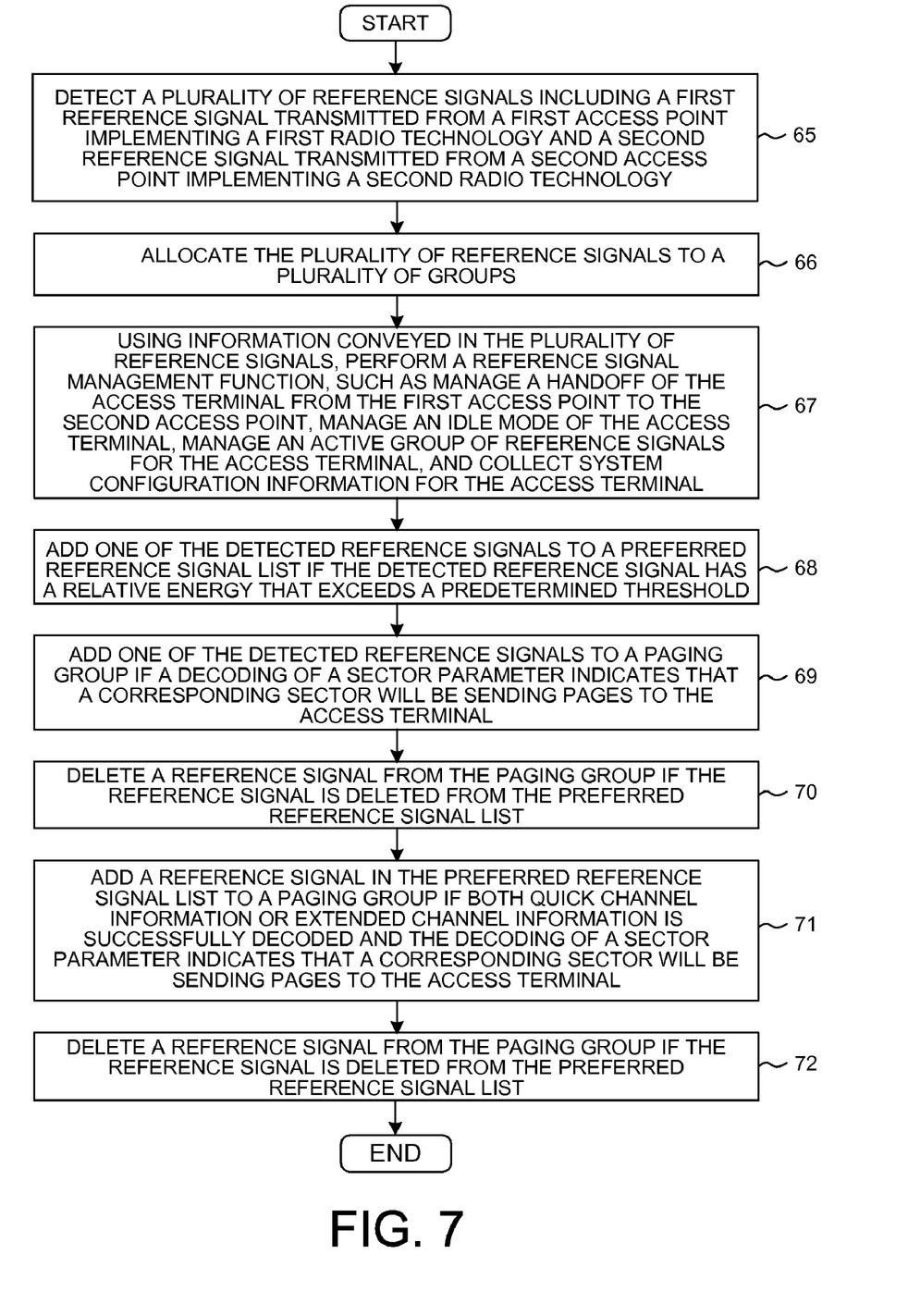
FIG. 7 is a flowchart of steps performed by the reference signal management program of FIG. 3 to manage reference signals and to perform connection and handoff functions.

FIG. 7 is a flowchart illustrating steps 65-72 of a method by which RSM program 48 manages pilot signals and uses information conveyed in those pilot signals to perform functions for access terminal 18. The steps of FIG. 7 will now be described in relation to the exemplary heterogeneous network topology 56 shown in FIG. 6.

In a first step 65, RSM program 48 detects multiple pilot signals, including first pilot signal 63, second pilot signal 64 and the pilot signals transmitted by the other heterogeneous access points. First pilot signal 63 is transmitted from first access point 58 that implements a first radio technology, namely 3GPP LTE. Second pilot signal 64 is transmitted from second access point 60 that implements a second radio technology, namely IEEE 802.11. In this example, 3GPP LTE and IEEE 802.11 are different radio technologies. In other exemplary topologies, even where both the first and second access points implement one type of radio technology, the radio technologies implemented by both access points might not be identical if the two access points use different frequencies, timing or other different operating parameters.

In a step 66, the software search commands 55 within main search block 49 allocate the multiple pilot signals into multiple groups, such as a candidate group, a remaining group, an active group, a preferred pilot list, a paging group, a quick paging set, an access group, and a serving sector.

In a step 67, RSM program 48 performs a reference signal management function using information conveyed in the detected pilot signals. For example, the reference signal management function can be (i) to manage a handoff of access terminal 18 from first access point 58 to second access point 60, (ii) to manage the idle mode of access terminal 18, (iii) to manage the active group of pilot signals for access terminal 18, and (iv) to collect overhead parameters for access terminal 18.

In order to perform reference signal management functions efficiently, RSM program 48 updates which pilot signals are in each of the groups. In a step 68, software search commands 55 add one of the detected pilot signals to the preferred pilot list if that detected pilot signal has a geometry that exceeds a predetermined threshold. In a step 69, software search commands 55 add one of the detected pilot signals to the paging group if the decoding of a sector parameter indicates that a corresponding sector will be sending pages to access terminal 18. For example, software search commands 55 add second pilot signal 64 to the paging group if the decoding of a sector parameter for non-serving sector 59 indicates that sector 59 will be sending pages to access terminal 18. In a step 70, software search commands 55 deletes a pilot signal from the paging group if the pilot signal is deleted from the preferred pilot list. In a step 71, software search commands 55 add a pilot signal from the preferred pilot list to the quick paging set if both (i) quick channel information (QCI) or extended channel information (ECI) is successfully decoded and (ii) the decoding of a sector parameter indicates that the corresponding sector will be sending pages to access terminal 18. In a step 72, software search commands 55 deletes a pilot signal from the quick paging set if that pilot signal is deleted from the preferred pilot list.

In another step, software search commands 55 configure the active group. The active group is configured when access terminal 18 sends a PilotReport message to first access point 58. The serving access point 58 uses the PilotReport message to add new sectors and access points to the active group. Non-serving sector 59 is added to the active group. Access point 58 tunnels the overhead parameters of the newly added sector 59 to access terminal 18 by receiving those parameters from second access point 60 over backhaul connection 61 and then transmitting those parameters to access terminal 18 using the communication link of serving sector 57.

It is understood that the specific order or hierarchy of steps in the method of FIG. 7 is an exemplary approaches. Based upon design preferences, it is understood that the specific order or hierarchy of steps in the method may be rearranged while remaining within the scope of the present disclosure. The accompanying method claims present elements of the various steps in a sample order, and are not meant to be limited to the specific order or hierarchy presented.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present disclosure.

Where one or more exemplary embodiments are implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. Memory 41 of access terminal 18 is an example of such a computer-readable medium. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. An exemplary computer-readable storage medium is coupled to a processor such the processor can read information from, and write information to, the storage medium. DSP 40 of access terminal 18 is an example of a processor that can read information from and write information to the storage medium of memory 41. In the alternative, the storage medium may be integral to the processor, such as DSP 40. The processor and the storage medium may reside in an ASIC. The ASIC may reside in a user terminal or access terminal 18. In the alternative, the processor and the storage medium may reside as discrete components in the user terminal or access terminal.

Although certain specific embodiments are described above for instructional purposes, the teachings of this patent document have general applicability and are not limited to the specific embodiments described above. For example, RSM program 48 is described above as being resident on access terminal 18. RSM program 48 may also, however, be resident on an access point or base station. In some embodiments, multiple reference signal management programs are run simultaneously, with some portions of main search block 49 resident on a base station and some portions resident on access terminal 18. Variations and modifications to the deployment of the reference signal management program may be developed without departing from the spirit and scope of the reference signal management system. Accordingly, various modifications, adaptations, and combinations of the various features of the described specific embodiments can be practiced without departing from the scope of the claims that are set forth below.

What is claimed is:

1. A method comprising: detecting a plurality of reference signals including a first reference signal and a second reference signal, wherein the first reference signal is transmitted from a first access point that has a first configuration, and wherein the second reference signal is transmitted from a second access point that has a second configuration, and wherein the first configuration is different than the second configuration; allocating the plurality of reference signals to a plurality of groups, wherein in an idle mode of the access terminal a set of the plurality of reference signals is further allocated to at least one of a plurality of subgroups including a paging group, a quick paging set, an access group and a serving sector group; performing a reference signal management function using information conveyed in the plurality of reference signals allocated to at least one of the plurality of subgroups, wherein the reference signal management function is taken from the group consisting of: managing a handoff of the access terminal from the first access point to the second access point, managing the idle mode of the access terminal, managing an active group of reference signals for the access terminal, and collecting system configuration information for the access terminal;

wherein the first configuration and the second configuration use the same system technology, and wherein the first configuration and the second configuration use different deployment parameters; and wherein the different deployment parameters differ by a length of a cyclic prefix.

2. The method of claim 1, wherein the first configuration and the second configuration correspond to different system technologies, and wherein the different system technologies are taken from the group consisting of: a wide area network (WAN) technology, a local area network (LAN) technology, and a personal area network (PAN) technology.

3. The method of claim 1, wherein the different deployment parameters differ by a number of Fast Fourier transform (FFT) tones used.

4. The method of claim 1, wherein the deployment parameters are time and frequency synchronization parameters.

5. The method of claim 4, wherein the time and frequency synchronization parameters of the first configuration differ from the time and frequency synchronization parameters of the second configuration due to lack of a common synchronization source.

6. The method of claim 1, wherein in a connected state mode of the access terminal the reference signal management program detects a reference signal energy of the second reference signal, and wherein the second reference signal is taken from the group consisting of: a broadband signal and a narrowband signal.

7. The method of claim 6, wherein the broadband signal is a time-division multiplexed (TDM) acquisition reference signal.

8. The method of claim 6, wherein the narrowband reference signal is a power-boosted frequency carrier.

9. The method of claim 6, wherein the access terminal is locked to a serving sector, and wherein the reference signal management program determines that a new sector from which the second reference signal is transmitted is asynchronous to the serving sector by processing the second reference signal.

10. The method of claim 1, wherein the reference signal management program calculates a relative energy and a reference signal energy for each detected reference signal.

11. The method of claim 1, wherein the first access point is a serving sector for the access terminal and the second access point is a non-serving sector for the access terminal, and wherein system configuration information for the non-serving sector is forwarded to the first access point via a backhaul connection for transmission to the access terminal in the serving sector.

12. The method of claim 1, wherein the first access point is a serving sector for the access terminal and the second access point is a non-serving sector for the access terminal, and wherein system configuration information for the non-serving sector is forwarded to the first access point by the access terminal.

13. The method of claim 1, further comprising: initiating an acquisition reference signal search when the access terminal wakes up during a paging cycle; adding detected reference signals to a preferred reference signal list; adding reference signals from the preferred reference signal list to a paging group; decoding paging channels of the reference signals in the paging group; and going to sleep if the decoding of the paging channels indicates that there is no page for the access terminal.

14. The method of claim 1, wherein the reference signal management program maintains a group of detected reference signals, and wherein the group is a preferred reference signal list.

15. The method of claim 14, wherein in a connected state mode of the access terminal, the reference signals in the preferred reference signal list are further allocated to subgroups taken from the group consisting of: a candidate group, a remaining group and an active group.

16. The method of claim 14, further comprising: adding one of the detected reference signals to the preferred reference signal list if the one detected reference signal has a relative energy that exceeds a predetermined threshold.

17. The method of claim 14, wherein the preferred reference signal list comprises the plurality of reference signals allocated to the subgroup.

18. The method of claim 17, further comprising: adding a reference signal in the preferred reference signal list to the paging group if a decoding of system configuration information from an access point corresponding to the reference signal indicates that the access point will be sending pages to the access terminal.

19. The method of claim 17, further comprising: deleting a reference signal from the paging group if the reference signal is deleted from the preferred reference signal list.

20. The method of claim 17, further comprising: adding a reference signal from the preferred reference signal list to the access group if system configuration information from an access point corresponding to the reference signal have been successfully decoded.

21. The method of claim 17, further comprising: adding a reference signal from the preferred reference signal list to the serving sector group if the reference signal is the strongest reference signal in the preferred reference signal list and if system configuration information from an access point corresponding to the reference signal has been successfully decoded.

22. The method of claim 1, wherein system configuration information from a new sector are acquired by decoding overhead channels from an access point associated with the new sector, provided that at least one of the following conditions is satisfied: system configuration information for the new sector is unknown; the validity of known system configuration information has expired; the validity of known system configuration information will expire shortly for a push-to-talk access terminal; a supervision timer equals zero; and a relative energy of the new sector is greater than a predetermined overhead decode threshold.

23. An electronic device configured to execute the method of claim 1.

24. An access terminal, comprising: a processor; a storage medium; and a reference signal management program stored on the storage medium, wherein the reference signal management program includes instructions that are executed by the processor to cause the access terminal to: detect a plurality of reference signals; to allocate the plurality of detected reference signals to a plurality of groups, wherein in an idle mode of the access terminal a set of the plurality of detected reference signals is further allocated to at least one of a plurality of subgroups including a paging group, a quick paging set, an access group and a serving sector group;
    to perform a reference signal management function using information conveyed in the detected reference signals allocated to at least one of the plurality of subgroups, wherein the plurality of reference signals includes a first reference signal and a second reference signal, wherein the first reference signal is transmitted from a first access point that has a first configuration and the second reference signal is transmitted from a second access point that has a second configuration, wherein the first configuration is different than the second configuration, and wherein the reference signal management function is taken from the group consisting of: managing a handoff of the access terminal, managing the idle mode of the access terminal, managing an active group of the detected reference signals, and collecting system configuration information for the access terminal;
    wherein the first configuration and the second configuration use the same system technology, and wherein the first configuration and the second configuration use different deployment parameters; and
    wherein the different deployment parameters differ by a length of a cyclic prefix.

25. The access terminal of claim 24, wherein the first configuration and the second configuration correspond to different system technologies, and wherein the different system technologies are taken from the group consisting of: a wide area network (WAN) technology, a local area network (LAN) technology, and a personal area network (PAN) technology.

26. The access terminal of claim 24, wherein the different deployment parameters differ by a number of Fast Fourier transform (FFT) tones used.

27. The access terminal of claim 24, wherein the deployment parameters are time and frequency synchronization parameters.

28. The access terminal of claim 24, wherein the time and frequency synchronization parameters of the first configuration differ from the time and frequency synchronization parameters of the second configuration due to lack of GPS synchronization.

29. The access terminal of claim 24, wherein in a connected state mode of the access terminal the reference signal management program detects a reference signal energy of the second reference signal, and wherein the second reference signal is taken from the group consisting of: a broadband signal and a narrowband signal.

30. The access terminal of claim 24, wherein the broadband signal is a time-division multiplexed (TDM) acquisition reference signal.

31. The access terminal of claim 24, wherein the narrowband reference signal is a power-boosted beacon reference signal.

32. The access terminal of claim 24, wherein the access terminal is locked to a serving sector, and wherein the reference signal management program determines that a new sector from which the second reference signal is transmitted is asynchronous to the serving sector by processing the second reference signal.

33. The access terminal of claim 24, wherein the reference signal management program calculates a relative energy and a reference signal energy for each detected reference signal.

34. The access terminal of claim 24, wherein the reference signal management program maintains a group of detected reference signals, and wherein the group is a preferred reference signal list.

35. The access terminal of claim 34, wherein in a connected state mode of the access terminal, the reference signals in the preferred reference signal list are further allocated to subgroups taken from the group consisting of: a candidate group, a remaining group and an active group.

36. The access terminal of claim 34, wherein the preferred reference signal list comprises the plurality of reference signals allocated to the subgroup.

37. The access terminal of claim 36, wherein the reference signal management program adds a reference signal from the preferred reference signal list to the paging group if a decoding of system configuration information from an access point corresponding to the reference signal indicates that the access point will be sending pages to the access terminal.

38. The access terminal of claim 36, wherein the reference signal management program deletes a reference signal from the paging group if the reference signal is deleted from the preferred reference signal list.

39. The access terminal of claim 24, wherein system configuration information from a new sector is acquired by decoding overhead channels from an access point associated with the new sector, provided that at least one of the following conditions is satisfied:
 system configuration information for the new sector is unknown; the validity of known system configuration information has expired;
 the validity of known system configuration information will expire shortly for a push-to-talk access terminal;
 a supervision timer equals zero; and
 a relative energy of the new sector is greater than a predetermined overhead decode threshold.

40. A set of processor-executable instructions stored on a non-transitory processor-readable medium, wherein execution of the set of processor-executable instructions causes a device for managing reference signals to perform operations including:
 detecting at an access terminal a plurality of reference signals including a first reference signal and a second reference signal, wherein the first reference signal is transmitted from a first access point that has a first configuration, and wherein the second reference signal is transmitted from a second access point that has a second configuration, and wherein the first configuration is different than the second configuration;
 allocating the plurality of reference signals to a plurality of groups, wherein in an idle mode of the access terminal a set of the plurality of reference signals is further allocated to at least one of a plurality of subgroups including a paging group, a quick paging set, an access group and a serving sector group;
 performing a reference signal management function using information conveyed in the plurality of reference signals allocated to at least one of the plurality of subgroups, wherein the reference signal management function is taken from the group consisting of: managing a handoff of the access terminal from the first access point to the second access point, managing the idle mode of the access terminal, managing an active group of reference signals for the access terminal, and collecting system configuration information for the access terminal; wherein the first configuration and the second configuration use the same system technology, and wherein the first configuration and the second configuration use different deployment parameters; and
 wherein the different deployment parameters differ by a length of a cyclic prefix.

41. The set of processor-executable instructions of claim 40, wherein the first configuration and the second configuration correspond to different system technologies, and wherein the different system technologies are taken from the group consisting of: a wide area network (WAN) technology, a local area network (LAN) technology, and a personal area network (PAN) technology.

42. The set of processor-executable instructions of claim 40, wherein the different deployment parameters differ by a number of Fast Fourier transform (FFT) tones used.

43. The set of processor-executable instructions of claim 40, wherein the deployment parameters are time and frequency synchronization parameters.

44. The set of processor-executable instructions of claim 40, wherein in a connected state mode of the access terminal execution of the set of processor-executable instructions results in a reference signal energy of the second reference signal being detected, and wherein the second reference signal is taken from the group consisting of: a broadband signal and a narrowband signal.

45. The set of processor-executable instructions of claim 40, wherein execution of the set of processor-executable instruction also cause the device for managing reference signals to perform operations including:
 initiating an acquisition reference signal search when the access terminal wakes up during a paging cycle;
 adding detected reference signals to a preferred reference signal list; adding reference signals from the preferred reference signal list to a paging group; decoding paging channels of the reference signals in the paging group; and
 going to sleep if the decoding of the paging channels indicates that there is no page for the access terminal.

46. A device comprising: means for receiving at an access terminal a plurality of reference signals; means for detecting the plurality of reference signals; means for allocating the plurality of detected reference signals to a plurality of groups, wherein in an idle mode of the access terminal a set of the plurality of reference signals is further allocated to at least one of a plurality of subgroups including a paging group, a quick paging set, an access group and a serving sector group;

means for performing a reference signal management function using information conveyed in the detected reference signals allocated to at least one of the plurality of subgroups, wherein the plurality of reference signals includes a first reference signal and a second reference signal, wherein the first reference signal is transmitted from a first access point that has a first configuration, and wherein the second reference signal is transmitted from a second access point that has a second configuration, wherein the first configuration is different than the second configuration, and wherein the reference signal management function is taken from the group consisting of: managing a handoff of the access terminal, managing the idle mode of the access terminal, managing an active group of the detected reference signals, and collecting system configuration information for the access terminal;

wherein the first configuration and the second configuration use the same system technology, and wherein the first configuration and the second configuration use different deployment parameters; and wherein the different deployment parameters differ by a length of a cyclic prefix.

47. The device of claim 46, wherein the first configuration and the second configuration correspond to different system technologies, and wherein the different system technologies are taken from the group consisting of: a wide area network (WAN) technology, a local area network (LAN) technology, and a personal area network (PAN) technology.

48. The device of claim 46, wherein the different deployment parameters differ by a number of Fast Fourier transform (FFT) tones used.

49. The device of claim 46, wherein the deployment parameters are time and frequency synchronization parameters.

50. The device of claim 46, wherein in a connected state mode of the access terminal the means detects a reference signal energy of the second reference signal, and wherein the second reference signal is taken from the group consisting of: a broadband signal and a narrowband signal.

51. A method comprising: detecting at an access terminal a plurality of reference signals including a first reference signal and a second reference signal, wherein the first reference signal is transmitted from a first access point that implements a first radio technology, and wherein the second reference signal is transmitted from a second access point that implements a second radio technology, and wherein the first radio technology is not identical to the second radio technology;

allocating the plurality of reference signals to a plurality of groups, wherein in an idle mode of the access terminal a set of the plurality of reference signals is further allocated to at least one of a plurality of subgroups including a paging group, a quick paging set, an access group and a serving sector group;

performing a reference signal management function using information conveyed in the plurality of reference signals allocated to at least one of the plurality of subgroups, wherein the reference signal management function is taken from the group consisting of: managing a handoff of the access terminal from the first access point to the second access point, managing the idle mode of the access terminal, managing an active group of reference signals for the access terminal, and collecting system configuration information for the access terminal;

and wherein the first radio technology is 3GPP LTE using a first cyclic prefix and the second radio technology is 3GPP LTE using a second cyclic prefix.

52. The method of claim 51, wherein the first radio technology is taken from the group consisting of: Wideband-CDMA (W-CDMA), Low Chip Rate (LCR), IS-2000, IS-95, IS-856, Global System for Mobile Communications (GSM), Evolved UTRA (E-UTRA), IEEE 802.11, IEEE 802.16, IEEE 802.20, Flash-OFDM, Ultra-Mobile Wideband (UMB), and 3GPP Long Term Evolution (LTE).

53. The method of claim 51, wherein the first radio technology is Evolved UTRA using a first number of Fast Fourier transform (FFT) tones and the second radio technology is Evolved UTRA using a second number of FFT tones.

54. The method of claim 51, wherein the first radio technology is GSM using a first transmission frequency, and the second radio technology is GSM using a second transmission frequency.

55. An access terminal, comprising:
a processor;
a storage medium; and
a reference signal management program stored on the storage medium, wherein the reference signal management program includes instructions that are executed by the processor to cause the access terminal to:
detect a plurality of reference signals;
allocate the plurality of detected reference signals to a plurality of groups, wherein in an idle mode of the access terminal a set of the plurality of reference signals is further allocated to at least one of a plurality of subgroups including a paging group, a quick paging set, an access group and a serving sector group;
perform a reference signal management function using information conveyed in the detected reference signals allocated to at least one of the plurality of subgroups, wherein the plurality of reference signals includes a first reference signal and a second reference signal, wherein the first reference signal is transmitted from a first access point that implements a first radio technology and the second reference signal is transmitted from a second access point that implements a second radio technology, wherein the first radio technology is not identical to the second radio technology, and wherein the reference signal management function is taken from the group consisting of: managing a handoff of the access terminal, managing the idle mode of the access terminal, managing an active group of the detected reference signals, and collecting system configuration information for the access terminal;
and wherein the first radio technology is 3GPP LTE using a first cyclic prefix and the second radio technology is 3GPP LTE using a second cyclic prefix.

56. The access terminal of claim 55, wherein the first radio technology is taken from the group consisting of: Wideband-CDMA (W-CDMA), Low Chip Rate (LCR), IS-2000, IS-95, IS-856, Global System for Mobile Communications (GSM), Evolved UTRA (E-UTRA), IEEE 802.11, IEEE 802.16, IEEE 802.20, Flash-OFDM, Ultra-Mobile Wideband (UMB), and 3GPP Long Term Evolution (LTE).

57. The access terminal of claim 55, wherein the first radio technology is Evolved UTRA using a first number of Fast Fourier transform (FFT) tones and the second radio technology is Evolved UTRA using a second number of FFT tones.

58. The access terminal of claim 55, wherein the first radio technology is GSM using a first transmission frequency, and the second radio technology is GSM using a second transmission frequency.

59. The access terminal of claim 55, wherein the first radio technology and the second radio technology are both 3GPP LTE, but the first radio technology uses a first timing and the second radio technology uses a second timing such that the first access point and the second access point are not time synchronized with each other.

60. The access terminal of claim 55, wherein in a connected state mode of the access terminal the reference signal management program detects a reference signal energy of the second reference signal, and wherein the second reference signal is taken from the group consisting of: a broadband signal and a narrowband signal.

* * * * *